United States Patent Office 3,329,242
Patented July 4, 1967

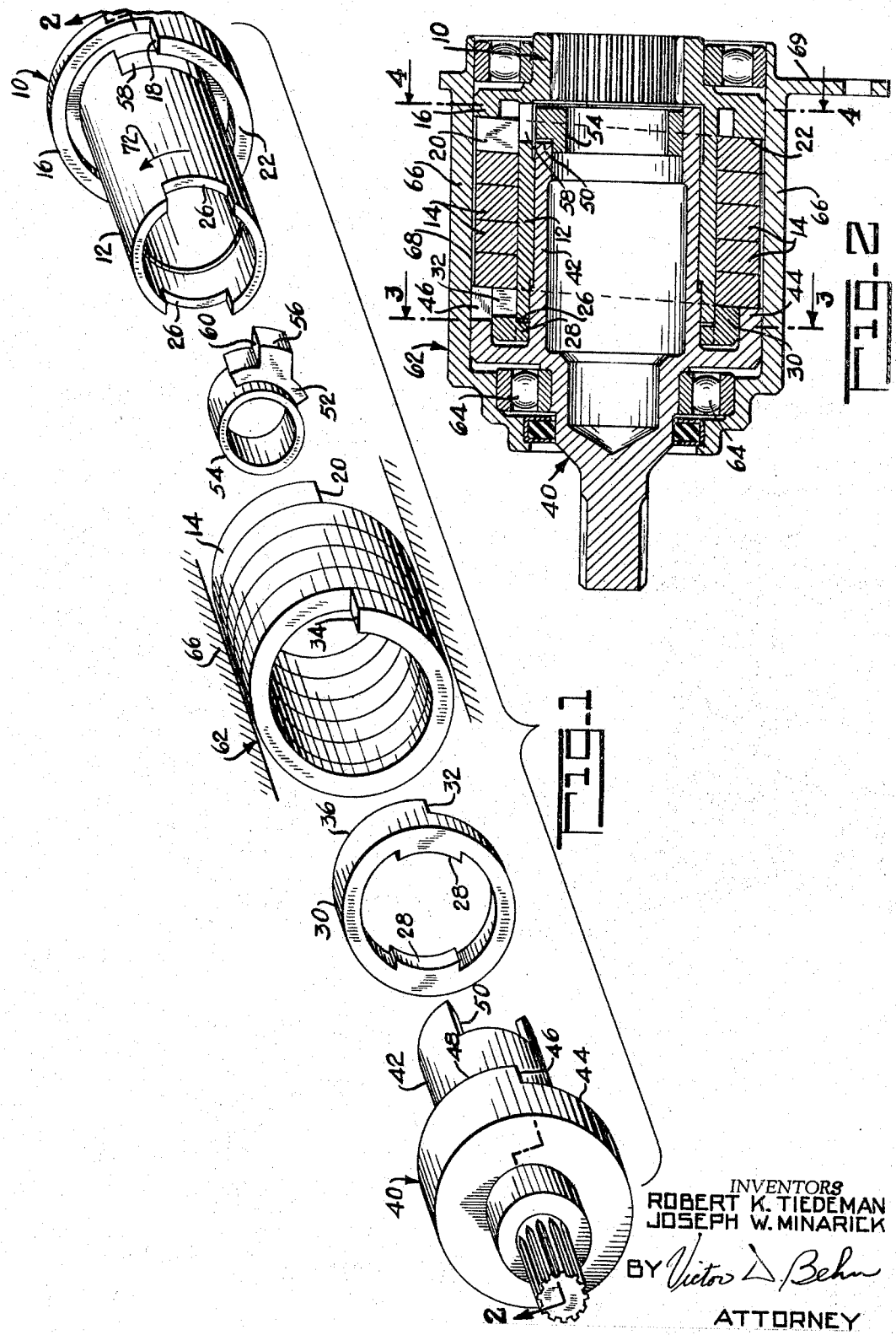

3,329,242
TORQUE LIMITING BRAKE MECHANISM
Joseph W. Minarick, Oakland, and Robert K. Tiedeman, Wayne, N.J., assignors to Curtiss-Wright Corporation, a corporation of Delaware
Filed May 24, 1965, Ser. No. 457,991
14 Claims. (Cl. 188—134)

ABSTRACT OF THE DISCLOSURE

A torque limiting brake mechanism is provided with a coil spring through which torque may be normally transmitted bidirectionally between input and output members of the device, but which is caused to grip a fixed member to brake the transmission of torque whenever torque reaches a predetermined value.

---

Figure 3:
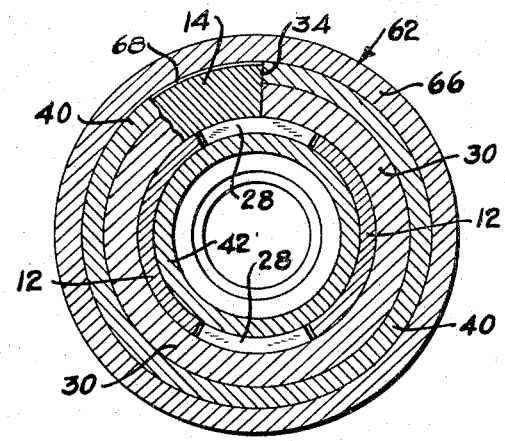

This invention relates to torque transmitting means including a torque limiting brake and more particularly is directed to such a mechanism in which the brake member is a coil spring member.

In many torque transmitting mechanisms in which an input torque is transmitted to an output load, parts of the torque transmitting mechanism or parts of the apparatus associated with the torque transmitting mechanism may be damaged if excessive input torque is transmitted. Such a torque overload could occur because some member of the torque transmitting mechanism has jammed or because the output load has increased.

A specific application of the invention is to the torque transmitting mechanism for operating the flaps on modern high speed aircraft where structural damage to the aircraft may result if the aircraft flaps are extended at high aircraft speeds. Likewise the torque transmitting mechanism itself may be damaged if the flaps are extended at high aircraft speeds because of the relatively high forces or loads on the flaps at these high speeds.

An object of the invention resides in the provision of a novel and simple torque transmitting and torque limiting brake mechanism in which a brake automatically engages to lock one of the torque transmitting members of the mechanism to a fixed structure when the torque being transmitted reaches a predetermined value.

More specifically it is an obect of the invention to provide a novel and simple torque transmitting and torque limiting brake mechanism including coil spring means which transmits the torque in either rotative direction and which when the torque exceeds a predetermined value changes its diametrical dimension to such an extent that the spring means engages a fixed member to brake said torque.

In the aforementioned application to the flap actuating mechanism for aircraft if the torque limiting brake engages to prevent flap actuation at high aircraft speeds, it is important that the torque transmitting mechanism be immediately available for transmitting torque in either direction when the aircraft speed is reduced, that is when the output load or torque resistance on said mechanism is reduced, without requiring any specific operation to disengage the brake. Accordingly a further object of the invention resides in the provision of a torque transmitting and torque limiting brake mechanism in which the brake of said mechanism is capable of limiting the torque in either direction of rotation when the torque exceeds a predetermined value and in which the mechanism is immediately available for transmitting torque as soon as the output torque resistance reduces below said value without requiring any operation to disengage the brake as, for example, reversing the direction of rotation.

Figure 4:
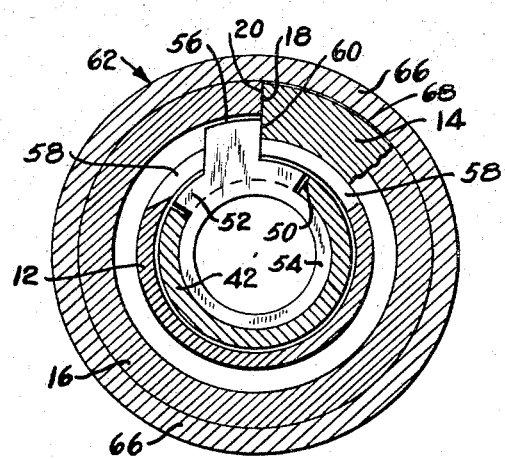

Other objects of the invention will become apparent upon reading the annexed detailed description in connection with the drawings in which FIG. 1 is an exploded perspective view of a torque transmitting and brake mechanism embodying the invention;

FIG. 2 is an axial sectional view of the said mechanism in a plane including axis of the mechanism, passing through the ends of the helical-coil member and looking upward in FIG. 1; and FIGS. 3 and 4 are sectional views taken along lines 3—3 and 4—4 of FIG. 2.

Referring to the drawing a torque transmitting member, indicated at 10, has a hollow cylindrical end portion or extension 12. The member 10 could be either the input or the output member of the machanism but for convenience of description the member 10 is herein referred to as the input member. Helical-coil spring means 14, which as illustrated preferably is a one-piece helical-coil spring having a plurality of turns, is coaxially disposed around the cylindrical portion 12 preferably so as to have a tight wrap fit around this portion.

The input member 10 has an axially projecting annular flange 16 surrounding and disposed adjacent to the inner end of its cylindrical end extension or portion 12. The flange 16 faces the helical-coil spring 14 and has a shoulder 18. This shoulder 18 is arranged to engage the radially outer portion of the end face 20 of the adjacent end of the coil spring member 14. The end face 22 of the flange 16 preferably has a helical configuration for substantially matching the helical configuration of the adjacent end turn of the coil spring member 14.

The outer end of the cylindrical end portion 12 has a pair of diametrically-opposed notches or slots 26 within which are received the lugs 28 of an abutment member 30. The slots and lugs 28 provide a detachable torque transmitting connection between the abutment member 20 and the end portion 12 so that the abutment member may be drivably connected to the input member 10 after the spring member 14 has been wrapped in position about the cylindrical end portion 12 whereby said abutment member 30 forms part of and is rotationally rigid with the input member 10.

The abutment member 30 has a shoulder 32 which is arranged to engage the radially inner portion of the end face 34 of the adjacent end of the coil spring member 14. The end surface 36 of the abutment member 30 facing the coil spring member 14 preferably has a helical configuration substantially matching the helical configuration of the adjacent end turn of said spring member.

The torque transmitting output member is indicated at 40 and has a cylindrical end portion or extension 42 which is arranged to be received within the hollow end portion 12 for relative rotation therein and for providing a pilot bearing fit for the output member 40 within the input member 10. Said output member 40 has an annular flange 44 surrounding and disposed adjacent to the inner end of its cylindrical end portion 42 and arranged to surround the input abutment member 30 with said input abutment member fitted between the cylindrical end portion 42 and the flange 44 of the output member 40. The flange 44 faces the helical-coil spring 14 and has a shoulder 46. This shoulder 46 is arranged to engage the radially outer portion of the end face 34 adjacent end of the coil spring member 14 radially outwardly of the portion of said end face 34 engageable by the input abutment 32. The end face 48 of the flange 44 preferably has a helical configuration substantially matching the helical configuration of the adjacent end turn of the coil spring member 14.

The outer end of the cylindrical end portion 42 of the output member has a notch 50 between which an abutment member 52 is received. The cylindrical end portion 42 preferably is hollow and the abutment member 52 has a hub portion 54 snugly received therein to stabilize the abutment member 52 in position. The abutment member 52 has an extension 56 which is arranged to project radially outwardly through a slot 58 in the hollow cylindrical end portion 12 of the input member. The slot 58 is adjacent the inner end of the cylindrical end portion 12 and the extension 56 projects therethrough to provide an end face or shoulder 60 for engagement with the radially inner portion of the end face 20 of the adjacent end of the coil spring member 14 radially inwardly of the portion of said end face 20 engageable by the input abutment 18.

The slot 58 has a substantially greater circumferential width than that of the extension 56 to permit limited relative rotative motion between the input and output members.

The fit of the abutment member 52 within the notch 50 provides a torque transmitting connection therebetween which is detachable to permit prior assembly of the abutment member 52 in position within the hollow end portion 12 with its extension 56 projecting through the slot 58. Thereafter the output member end portion 42 is inserted into the hollow end portion 12 with the notch 50 straddling the abutment 52 to provide a torque transmitting connection therebetween whereby the abutment 52 in effect forms part of and is rotationally rigid with the output member 40.

As best seen in FIG. 2 the input and output members 10 and 40 are journaled in a fixed housing member 62 by bearings 64. The housing 62 is also schematically indicated in FIG. 1. The housing member 62 has a cylindrical or sleeve portion 66 which coaxially surrounds the coil spring member 14 with a small radial clearance 68 therebetween. This clearance is exaggerated in FIGS. 1 and 2 for the purpose of illustration. In an actual design this clearance was approximately 0.004 inch for a coil spring having an external diameter of about 2⅝ inches. The housing 62 has one or more flanges 69 for fixedly securing the housing in position.

With the foregoing construction, when the input member is rotating in a counter clockwise direction, as viewed in FIG. 1 and as shown by the arrow 72, input torque is applied by the input shoulder 18 to one end of the coil spring member 14 through its end face 20. The other end of the coil spring member 14 transmits this torque to the output member 40 by engagement of the other end face 34 of the coil spring member 14 with the shoulder 46 on the output member 40. This torque transmission through the coil spring member 14 obviously is in a direction tending to unwind and diametrically expand said spring member 14.

Now consider the input member 10 rotating in the opposite rotative direction, that is clockwise as viewed in FIG. 1. Input torque is now applied to one end (the end opposite to the end receiving input torque when the input torque is counter clockwise as viewed in FIG. 1) of the coil spring member 14 by engagement of the shoulder 32 on the input member with the end face 34 of the coil spring member. The other end of the coil spring member 14 transmits this torque to the output member 40 by engagement of the other end face 20 of the coil spring member 14 with the shoulder 60 on the output member 40. This torque transmission through the coil spring member 14 obviously also is in a direction tending to unwind and diametrically expand said spring member.

The coil spring member 14 remains wrapped about and in contact with the input member cylindrical portion 12 as long as the input torque is below a predetermined value, the magnitude of which depends on the tightness of the fit between said spring member 14 and the cylindrical portion 12. When this input torque is exceeded, regardless of the direction of rotation, the coil spring member unwinds and expands diametrically away from the cylindrical portion 12. When the input torque reaches a predetermined higher value the spring member 14 engages the sleeve portion 66 of the fixed housing 62 to apply a braking action to further transmission of torque. Obviously the magnitude of this braking action increases with increase in input torque. Thus the coils of the coil spring member function as brake shoes in engaging the fixed sleeve 66 to limit the magnitude of the input torque which can be transmitted to the output member 40. Engagement of the coils of the spring member 14 with the fixed sleeve 66 serves to brake or stall the input member 10.

As explained, if the torque load has increased to a value at which the coil spring member 14 expands and contacts the fixed sleeve 66, said coil spring then acts as a brake shoe to brake or stall further torque transmission by braking the input member 10. If now there is a slight reduction in the torque load the coil spring member 14 will collapse diametrically on the cylindrical end portion 12 thereby disengaging or interrupting said brake action and permitting torque to be transmitted immediately in either rotative direction without any specific action to reset or otherwise again condition the mechanism for torque transmission. For example, consider the specific application previously mentioned in which the output member is operatively connected to the flaps of an aircraft in which extension of the flaps at high aircraft speeds would impose excesive loads on the flaps and on the aircraft as well as on the flap actuating mechanism. In such an application the coil spring member 14 would function as a torque limiting brake to prevent extension of the flaps at high aircraft speeds. When however the aircraft speed is reduced so that the torque required to extend the flaps is reduced the coil spring member 14 will contract to permit immediate transmission of torque from the input member 10 to the output member 40 to actuate the flaps in either direction.

In the embodiment described, torque, regardless of the direction of rotation, is transmitted through the coil spring member 14 in a direction tending to diametrically expand the coil spring member and as illustrated the coil spring member is wound tight on the input cylinder portion 12. Obviously however the coil spring member in its free unloaded condition may be wound so that the adjacent turns are open or spaced from each other instead of being wound tight as illustrated. In such a spring arrangement the mechanism obviously could be arranged so that torque is transmitted through the coil spring in a direction to tighten or diametrically contract the coil spring member. In this latter arrangement the fixed member engageable by the coil of the spring member for providing the braking action would have to be disposed on the inside of the spring member so that a predetermined contraction of the spring would provide the braking action. It is also obvious that with the embodiment illustrated either member 10 or 40 could be the input member with the other being the output member.

While only one embodiment of the invention has been shown and described, it will be apparent to one skilled in the art that other forms of the invention are possible, and that various changes and modifications may be made in the device illustrated and described without departing from the spirit and scope of the invention.

I claim:
1. A combined torque transmitting and torque limiting brake mechanism, said mechanism comprising
   (a) first and second coaxial rotatable torque transmitting members with one of said members being the input member and with the other of said members being the output member;
   (b) helical-coil spring means coaxial with said members for transmitting torque from the input member to the output member;
   (c) means operatively connecting the input and output members to different portions of said coil spring means depending on the direction of rotation of the input member for transmitting torque therefrom through at least a portion of said coil spring means such that said torque transmission tends to produce a change in the same direction in the diameter of said portion of the coil spring means regardless of the direction of said rotation; and (d) a fixed member having an annular wall concentric with the helical-coil spring means, the wall being spaced apart from coils of the spring means to avoid interference with the transmission of torque up to a predetermined value but disposed for engagement by said coils, due to a change in the diameter thereof, when torque reaches such predetermined value to brake the transmission of said torque.

2. A combined torque transmitting and torque limiting brake mechanism, said mechanism comprising (a) first and second coaxial rotatable torque transmitting members with one of said members being the input member and with the other of said members being the output member;

(b) helical-coil spring means coaxial with said members for transmitting torque from the input member to the output member;

(c) means operatively connecting one of said input and output members to a portion of said coil spring means when the input member is rotating in a first direction and operatively connecting said one member to another portion of the coil spring means, axially spaced from said first portion, when the input member is rotating in the opposite direction;

(d) means operatively connecting the other of said members to said coil spring means so that in either direction of rotation of the input member torque is transmitted to the output member through at least a portion of said coil spring means such that said torque transmission tends to produce a change in the same direction in the diameter of said portion of said coil spring means regardless of the direction of said rotation; and (e) a fixed member having an annular wall concentric with the helical-coil spring means, the wall being spaced apart from coils of the spring means to avoid interference with the transmission of torque up to a predetermined value but disposed for engagement by said coils, due to a change in the diameter thereof, when torque reaches such predetermined value to brake the transmission of said torque.

3. A mechanism as claimed in claim 2 and in which said coil spring means and a portion of one of said input and output members are coaxial and coextensive with said coil spring means and said portion and said one member having a tight fit when the transmitted torque is less than a predetermined value.

4. A combined torque transmitting and torque limiting brake mechanism, said mechanism comprising (a) a first rotatable torque transmitting member having a cylindrical end portion;

(b) helical-coil spring means coaxial with said cylindrical end portion with one end of the coil spring means being disposed adjacent to the inner end of said cylindrical end portion and with the other end of the coil spring means being disposed adjacent to the outer end of said cylindrical end portion;

(c) said first member having first abutment means disposed adjacent to the inner end of said cylindrical portion for abutting engagement with the adjacent end of said helical-coil spring means and having a second abutment means adjacent to the outer end of said cylindrical end portion for engagement with the adjacent other end of said helical-coil spring means;

(d) a second rotatable torque transmitting member having a cylindrical end portion coaxial with said cylindrical end portion of the first member, one of said torque transmitting members being the input torque transmitting member and the other being the output torque transmitting member;

(e) said second torque transmitting member having means operatively engageable with said coil spring means so that in either rotative direction of the input member torque is transmitted to the output member through at least a portion of said coil spring means such that said torque transmission tends to produce a change in the same direction in the diameter of said portion of said coil spring means regardless of the direction of said rotation; and (f) a fixed member disposed adjacent to and surrounding the helical-coil spring means for engagement by at least a portion of the coil spring means when the torque transmitted reaches a predetermined value thereby braking transmission of said torque.

5. A mechanism as claimed in claim 4 and in which said helical-coil spring means and said first member cylindrical end portion have a tight fit when the transmitted torque is less than a predetermined value.

6. A combined torque transmitting and torque limiting brake mechanism, said mechanism comprising (a) a first rotatable torque transmitting member having a hollow cylindrical end portion;

(b) a helical-coil spring member coaxial with and surrounding said cylindrical end portion with one end of the coil spring member being disposed adjacent to the inner end of said cylindrical portion and with the other end of the coil spring member being disposed adjacent to the outer end of the coil spring member;

(c) said first member having first abutment means disposed adjacent to the inner end of said cylindrical portion for abutting engagement with the adjacent end of said coil spring member and having a second abutment means adjacent to the outer end of said cylindrical end portion for engagement with the adjacent other end of said coil spring member;

(d) a second rotatable torque transmitting member having a cylindrical end portion coaxial with and extending into said hollow cylindrical end portion of the first member, one of said torque transmitting members being the input torque transmitting member and the other being the output torque transmitting member;

(e) said second torque transmitting member having first abutment means disposed adjacent to the inner end of its cylindrical end portion for engagement with the adjacent end of said coil spring member and having second abutment means disposed adjacent to the outer end of its cylindrical end portion for engagement with the other end of coil spring member so that said coil spring member serves to transmit torque from the input member to the output member and said coil spring member tends to unwind and expand diametrically upon transmission of torque in either rotative direction; and (f) a fixed sleeve surrounding the coil spring member for engagement by said spring member when the torque transmitted reaches a predetermined value thereby braking transmission of said torque.

7. A mechanism as claimed in claim 6 and in which the second abutment means of said first member has a detachable connection with the cylindrical end portion of said first member and the second abutment means of said second member has a detachable connection with the cylindrical end portion of the second member.

8. A mechanism as claimed in claim 6 and in which the second abutment means of said second member projects radially outwardly through a slot in the cylindrical end portion of the first member.

9. A mechanism as claimed in claim 8 and in which said slot has a greater circumferential width than the portion of the abutment means projecting therethrough.

10. A mechanism as claimed in claim 6 and in which said coil spring member has a tight wrap fit about the cylindrical end portion of said first torque transmitting